United States Patent
Ozaki et al.

(10) Patent No.: US 12,393,064 B2
(45) Date of Patent: Aug. 19, 2025

(54) SEMICONDUCTOR OPTICAL MODULATOR

(71) Applicant: Nippon Telegraph and Telephone Corporation, Tokyo (JP)

(72) Inventors: Josuke Ozaki, Musashino (JP); Yoshihiro Ogiso, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 310 days.

(21) Appl. No.: 18/006,835

(22) PCT Filed: Jul. 29, 2020

(86) PCT No.: PCT/JP2020/029132
§ 371 (c)(1),
(2) Date: Jan. 25, 2023

(87) PCT Pub. No.: WO2022/024276
PCT Pub. Date: Feb. 3, 2022

(65) Prior Publication Data
US 2023/0273467 A1 Aug. 31, 2023

(51) Int. Cl.
*G02F 1/025* (2006.01)
*G02F 1/21* (2006.01)
*G02F 1/225* (2006.01)

(52) U.S. Cl.
CPC .............. *G02F 1/025* (2013.01); *G02F 1/212* (2021.01); *G02F 1/2257* (2013.01)

(58) Field of Classification Search
CPC ...................................................... G02F 1/025
See application file for complete search history.

(56) References Cited

U.S. PATENT DOCUMENTS

| | | | |
|---|---|---|---|
| 2011/0229070 A1 | 9/2011 | Doi et al. | |
| 2012/0027337 A1* | 2/2012 | Kondou | G02B 6/29352 385/3 |
| 2014/0153860 A1 | 6/2014 | Prosyk | |

(Continued)

FOREIGN PATENT DOCUMENTS

| | | |
|---|---|---|
| EP | 3 432 058 A1 | 1/2019 |
| JP | 2019-045666 A | 3/2019 |

(Continued)

OTHER PUBLICATIONS

J. Ozaki, et al., *Ultra-low Power Dissipation (< 2.4 W) Coherent InP Modulator Module with CMOS Driver IC*, Mo3CC2, ECOC, 2018, pp. 1-3.

(Continued)

*Primary Examiner* — Charlie Y Peng
(74) *Attorney, Agent, or Firm* — Workman Nydegger

(57) ABSTRACT

A semiconductor optical modulator in which a radio frequency (RF) line which is disposed parallel to an optical waveguide and is a differential configuration for transmitting an RF modulation signal, a connecting pad which is formed in the same direction continuously with the RF line, and a termination resistor which has two rectangular resistors for differentially terminating the RF modulation signal from the connecting pad are linearly disposed, and terminated on-chip, and the RF line which forms a differential pair immediately after passing through the termination resistor is short-circuited.

9 Claims, 11 Drawing Sheets

(56) References Cited

U.S. PATENT DOCUMENTS

| | | | |
|---|---|---|---|
| 2020/0004102 A1* | 1/2020 | Kono | G02F 1/011 |
| 2021/0232016 A1 | 7/2021 | Ogiso et al. | |
| 2022/0011606 A1 | 1/2022 | Ito et al. | |

FOREIGN PATENT DOCUMENTS

| | | | | |
|---|---|---|---|---|
| JP | 2019-194637 | A | | 11/2019 |
| JP | 2020-003600 | A | | 1/2020 |
| JP | 2020-095122 | A | | 6/2020 |
| JP | 6817912 | B2 | * | 1/2021 |
| WO | 2010/064417 | A1 | | 6/2010 |
| WO | WO-2017080923 | A1 | * | 5/2017 ........... G02F 1/0121 |
| WO | 2019/211991 | A1 | | 11/2019 |
| WO | 2020/121928 | A1 | | 6/2020 |

OTHER PUBLICATIONS

N. Wolf, et al., *Electro-Optical Co-Design to Minimize Power Consumption of a 32 GBd Optical IQ-Transmitter Using InP MZ-Modulators*, CSICS, 2015, pp. 1-4.

* cited by examiner

SEMICONDUCTOR OPTICAL MODULATOR

TECHNICAL FIELD

The present disclosure relates to an ultra-high speed semiconductor optical modulator for modulating an optical signal with an electrical signal.

BACKGROUND ART

In order to cope with an increasing communication traffic demand, a high-speed optical modulator corresponding to an advanced optical modulation system is required. In particular, a multi-level optical modulator using digital coherent techniques plays a major role in realizing a large-capacity transceiver exceeding 100 Gbps.

In order to add independent information to an amplitude and a phase of light in these multi-level optical modulators, Mach-Zehnder interference type optical modulators (hereinafter, MZM) capable of zero-chirp driving are incorporated in multiple parallel stages.

In recent years, miniaturization and low driving voltage of an optical transmitter module have become problems, and research and development of a semiconductor MZ optical modulator which is small in size and can achieve a low driving voltage have progressed in an elaborate manner. Further, in the research and development of a semiconductor MZ optical modulator, movement to support a high baud rate such as 64 GBaud and 100 GBaud is accelerated, and a wide band of the optical modulator is required. Amid this, the research and development of a high-bandwidth coherent driver modulator (HB-CDM) aiming to improve the characteristics of only an optical modulator, and to improve the radio frequency (RF) characteristics by integrating a driver and an optical modulator in one package and performing the cooperative design of the driver and the optical modulator have accelerated. (NPL 1)

In the configuration of the HB-CDM, since the optical modulator is integrated with a driver for differential driving, it is preferable that the modulator itself also be configured on the basis of differential driving. Since the driver and the modulator are integrated with each other in the configuration of HB-CDM, design including not only the modulator but also the driver is very important. In particular, in the HB-CDM, an open collector type (or open drain type) driver is used to reduce power consumption. (NPL 1, NPL 2)

In an open collector type driver (or an open drain type driver), since an output end is an open end, if an RF line of the optical modulator is not successfully terminated, and the modulated electrical signal returns along the RF line, a resonance occurs between the driver and the termination resistor, deterioration of the modulation bandwidth and periodic waviness occur in the RF characteristics, resulting in deterioration of signal quality. Therefore, in recent years, the degree of importance of impedance matching between the impedance of the modulation electrode of the optical modulator and the impedance of the driver and the termination resistor has increased greatly.

In addition, in a configuration of an in-phase quadrature (IQ) optical modulator, when the RF line length of the optical modulator differs between the IQs, waviness of different cycle occurs between the IQs and RF characteristics differ between the IQs in the RF characteristics, which becomes a factor of variation. In order to realize a high baud rate such as 64 GBaud and 100 GBaud, it is necessary to terminate the high baud rate with high accuracy after impedance matching is taken over the entire area in a wide frequency range (about 40 GHz for 64 GBaud, and about 60 GHz for 100 GBaud). At present, a high baud rate is required, and thus there is a need for a technique for optimizing the termination resistor and suppressing the influence of impedance mismatching without a difference in structure between IQs in a wide band.

FIG. 1 shows an example of a conventional semiconductor Mach-Zehnder modulator (MZM). (PTL 1)

In a conventional semiconductor Mach-Zehnder modulator 100 of FIG. 1, input light from an input optical waveguide 101a on a lower left side is branched into two arm optical waveguides 101 by a 1×2 MMI coupler 102 on a branching side. The branched optical signal is subjected to optical phase modulation by passing under the traveling wave type electrode 121 of a two-row capacitive loading structure (a facing structure in which T-shaped and inverted T-shaped horizontal rod electrode portions that periodically protrude from an electrode body of the differential line are disposed on an arm optical waveguide) which is driven by differential modulated electrical signals DATA and /DATA (a line above the electrical signal symbol in the drawing is replaced with "/" to represent a signal of opposite polarity) which are each input from a left end of the drawing.

The arm optical signals subjected to optical phase modulation undergo multiplexing interference from a 2×1 MMI (multi-mode interference) coupler 103 on the multiplexing side and output from an optical waveguide at the center of the right end. On the output side of the 2×1 MMI coupler 103, two upper and lower bank patterns 110 are provided with a central optical waveguide from which interference light is output between them, as high-order mode light radiating means for radiating high-order mode light of the multimode interference coupler.

Electrode lines 122 and 123 of a pair of differential RF lines 120 of two rows and one pair, through which the differential modulated electrical signals DATA and /DATA pass, pass over the 2×1 MMI coupler 103, are bent to the right upper side, and are terminated by an off-chip at a 50Ω terminal resistor.

In a differential RF line 120 bent to the upper right for transmitting differential modulated electrical signals DATA and /DATA, because a difference occurs in the line length between the two electrode lines forming the differential pair due to the difference in curvature between the inside and outside of the electrode lines 122 and 123, there is a risk of the characteristics of the differential signal deteriorating, noise being generated, and RF characteristics deteriorating.

FIG. 2 shows an example of a conventional IQ optical modulator (PTL 2). Although the details are omitted, two optical waveguides of MZM similar to those of FIG. 1 are provided in the optical paths of two IQ systems in which the optical input from the input optical waveguide 10 on the lower left side of FIG. 2 is branched by the coupler 11 and leads to the optical output from the output optical waveguide 47 on the right side. In the conventional IQ optical modulator shown in FIG. 2, since the modulation electrodes (20, 21, 22, and 23) driven by the modulated electrical signals of I, /I, Q, and/Q at the left end are off-chip ends on the lower end side of the chip as shown by circles, a bent portion is provided in the part of the modulation electrode. The bent portion of the modulation electrode increases the chip size and causes the electrode length to differ between the IQs, and waviness of a different period between the IQs occurs in the RF characteristic of the IQ optical modulator.

CITATION LIST

Patent Literature

[PTL 1] Japanese Patent Application Publication No. 2019-194637
[PTL 2] Japanese Patent Application Publication No. 2019-45666

Non Patent Literature

[NPL 1] J. Ozaki, et al., "Ultra-low Power Dissipation (<2.4 W) Coherent InP Modulator Module with CMOS Driver IC", Mo3CC2, ECOC, 2018
[NPL 2] N. Wolf, et al., "Electro-Optical Co-Design to Minimize Power Consumption of a 32 GBd Optical IQ-Transmitter Using InP MZ-Modulators", CSICS, 2015

SUMMARY OF INVENTION

In order to realize an optical modulator which operates at a high baud rate and at an ultra-high speed, it is necessary to terminate the optical modulator with high accuracy after impedance matching is taken over the entire area in a wide frequency range of the modulated electrical signal. At present, a high baud rate is required, and therefore, on the differential RF line, it is necessary to provide a structure that minimizes bending that may lead to deterioration of characteristics, optimizes the structure of the termination resistor, and suppresses the influence of impedance mismatch without any difference in structure between IQs in a wide band.

The present invention provides a small-sized termination resistor structure capable of terminating an RF line for modulation of an optical modulator with high accuracy over a wide band, and suppressing the periodic waviness when connecting an open collector type driver. In addition, when slight periodic waviness occurs, the same period is formed between IQs.

A semiconductor optical modulator according to an aspect of the present invention includes an RF line which is disposed parallel to an optical waveguide and is a differential configuration for transmitting an RF modulation signal, a connecting pad which is formed in the same direction continuously with the RF line, and a termination resistor which has two rectangular resistors for differentially terminating the RF modulation signal from the connecting pad. The RF line, the connecting pad, and the termination resistor are linearly disposed, and the RF line is terminated on-chip. An opposite side of the connecting pad of the termination resistor is short-circuited.

As described above, according to one aspect of the present invention, it is possible to realize a semiconductor optical modulator which terminates the RF line of the optical modulator with high accuracy over a wide band and has a small-sized termination resistor. When the optical modulator is connected to, for example, an open collector type driver, periodic waviness of RF characteristics can be suppressed, and even when slight periodic waviness occurs in the RF characteristics, the same period can be obtained between IQs.

Figure 5:
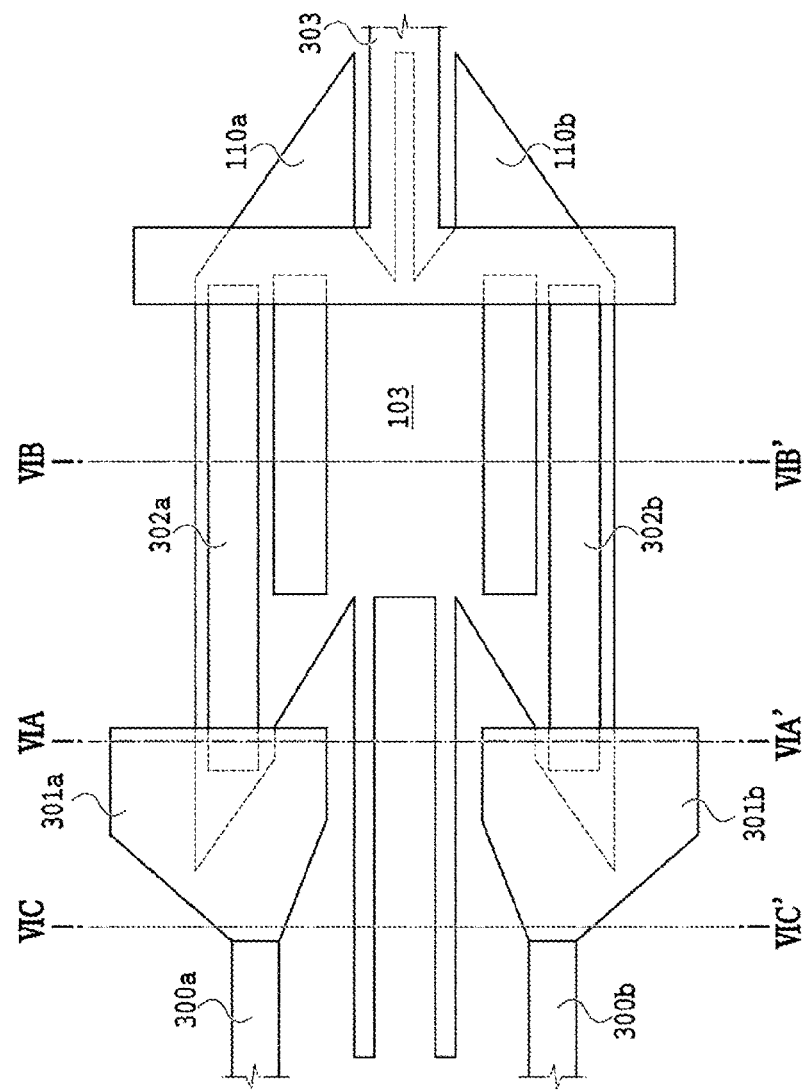
FIG. 5 is an enlarged plan view of the structure of the terminal structure of the semiconductor optical modulator according to an embodiment of the present invention.
Figure 6:
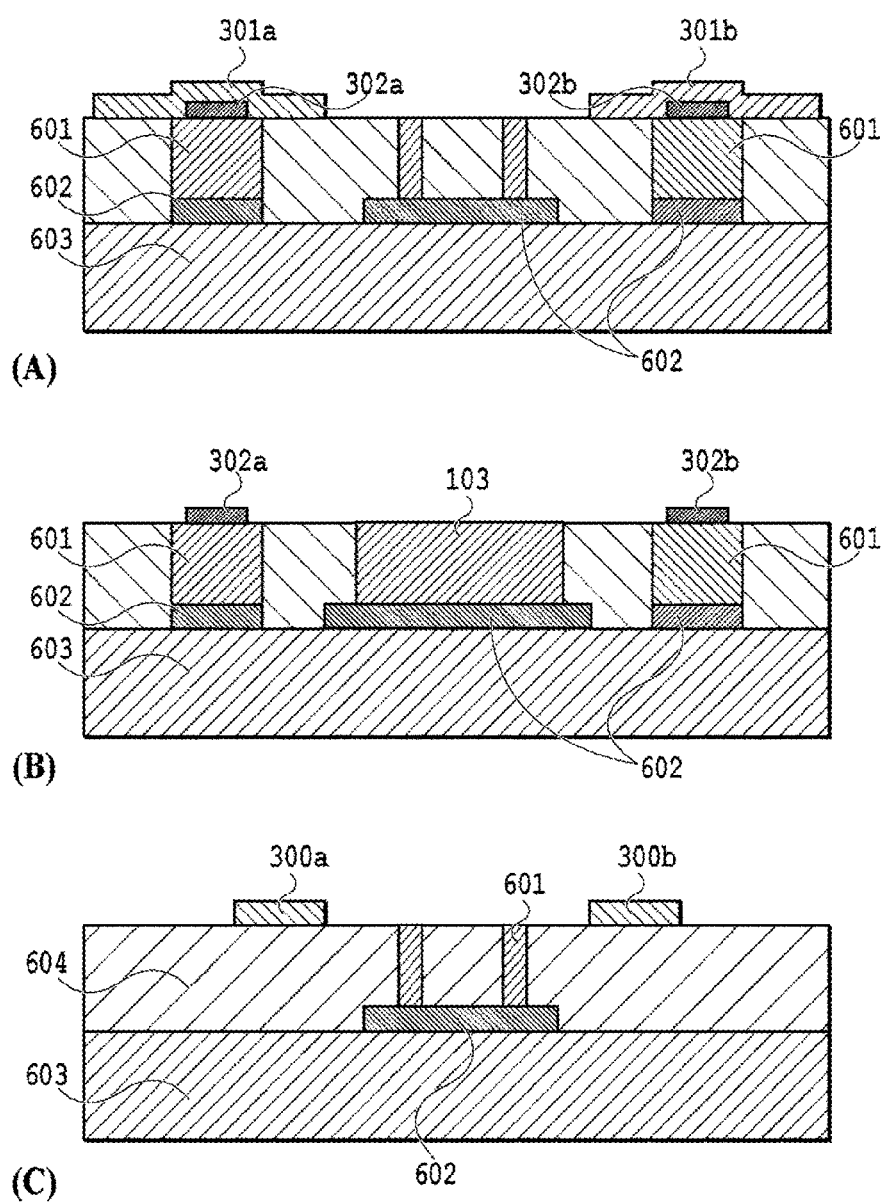

(A), (B), and (C) of FIG. 6 are cross-sectional views of each part of the terminal structure of the semiconductor optical modulator of FIG. 5.

Figure 7:
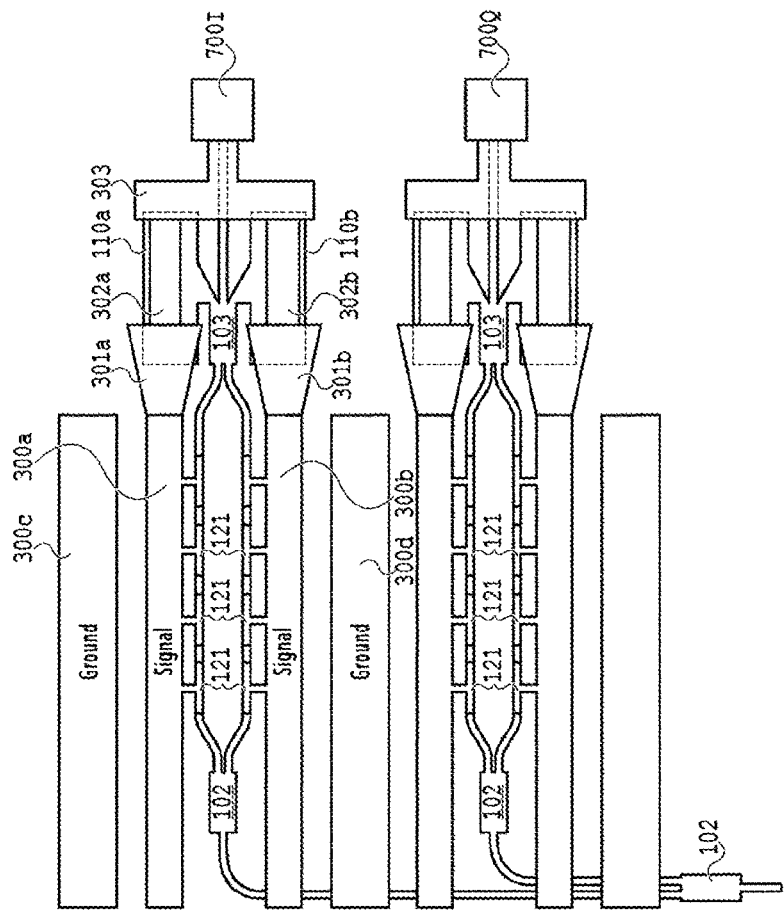

FIG. 7 is a plan view of an IQ optical modulator according to a second embodiment of the present invention.

Figure 8:
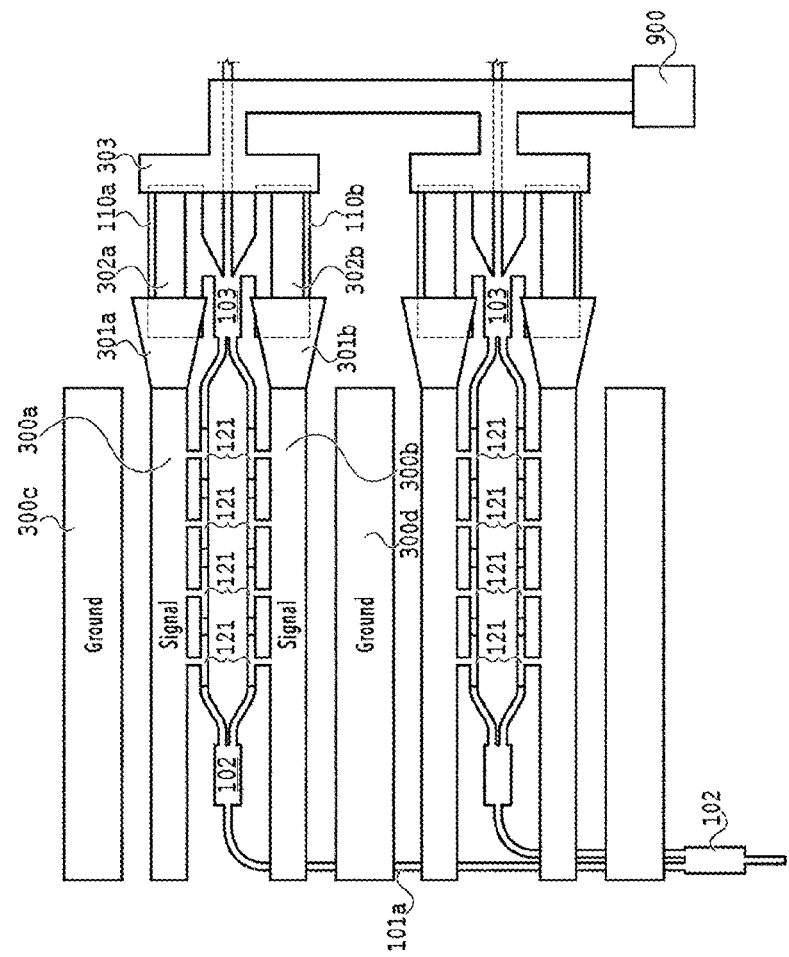

FIG. 8 is a plan view of an IQ optical modulator according to the second embodiment of the present invention.

Figure 9:
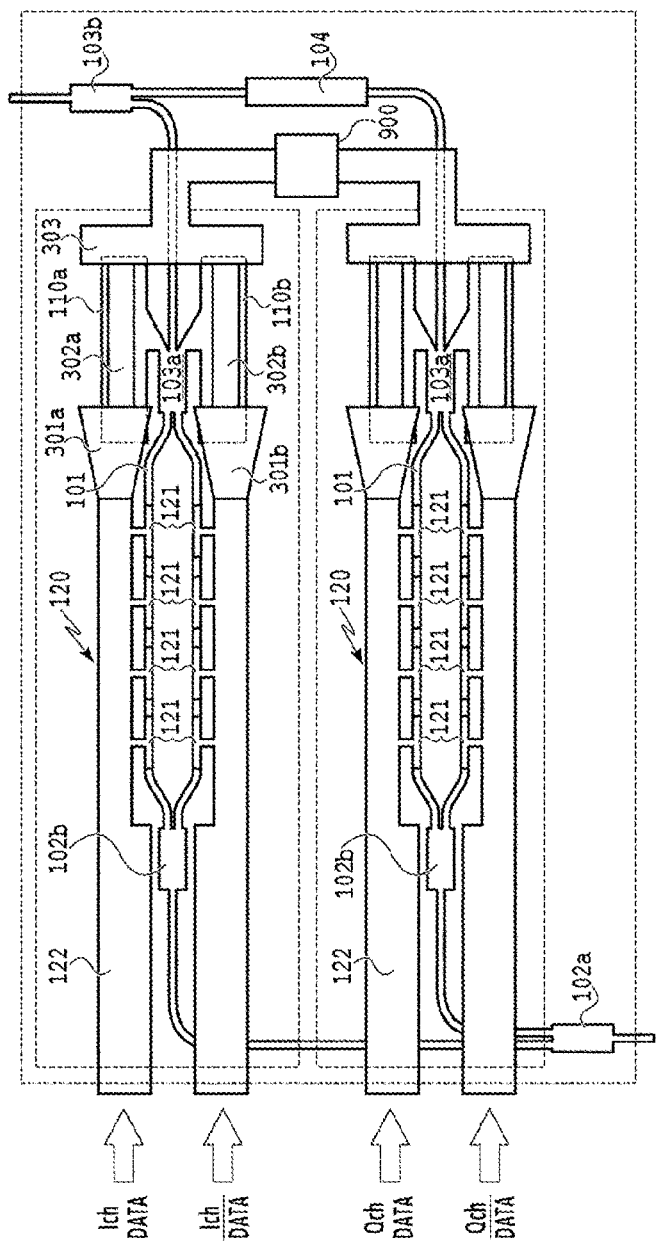

FIG. 9 is a plan view of an IQ optical modulator according to the second embodiment of the present invention.

Figure 10:
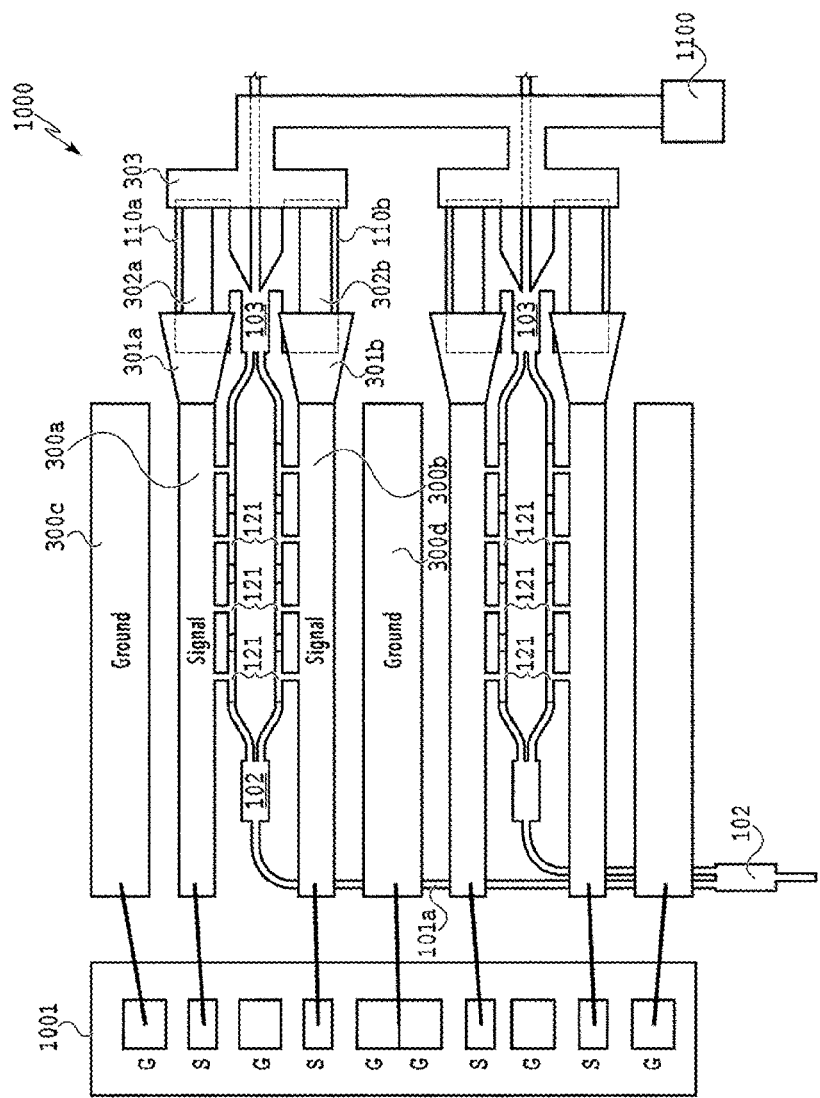

FIG. 10 is a plan view showing a connection image of an IQ optical modulator with a driver IC according to the second embodiment of the present invention.

Figure 11:
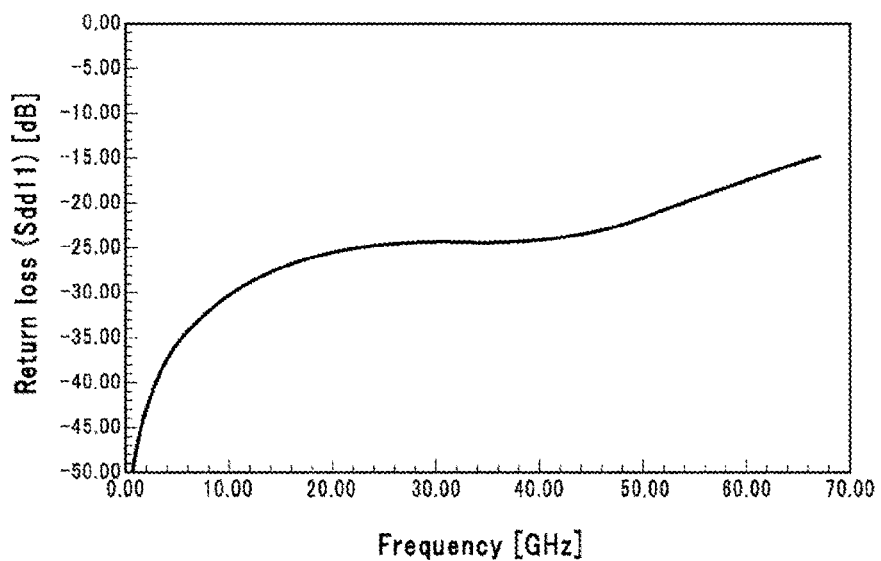

FIG. 11 is a diagram showing an example of a spectral reflection factor according to an embodiment of the present invention.

DESCRIPTION OF EMBODIMENTS

Hereinafter, embodiments of the present invention will be described in detail with reference to the drawings.

First Embodiment

Figure 3:
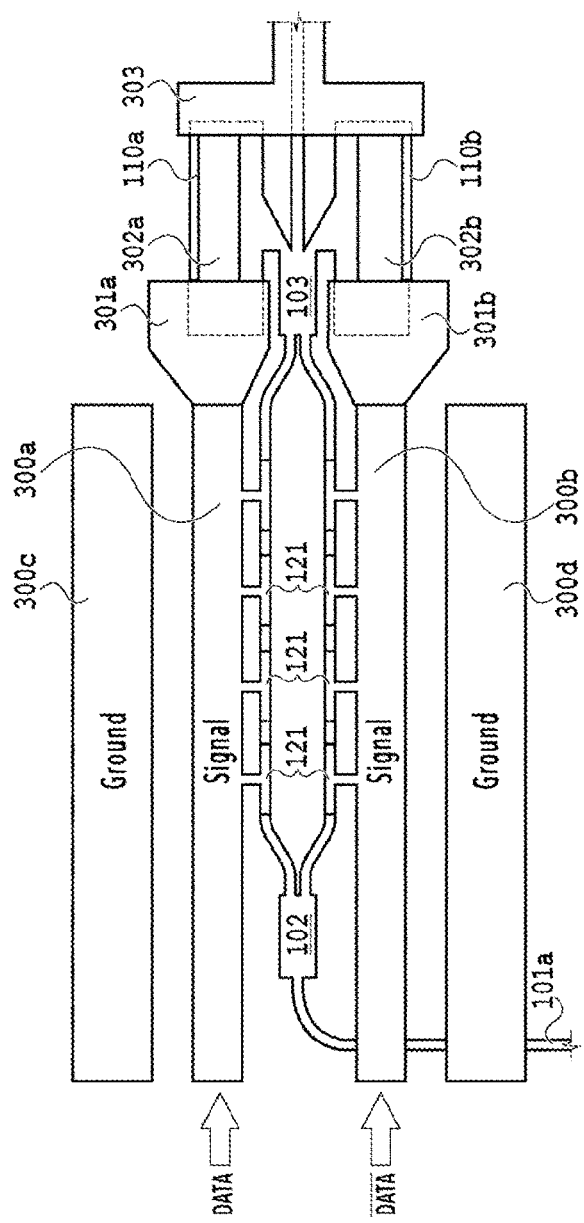
FIG. 3 is a diagram showing a structure of a semiconductor optical modulator of the embodiment of the present invention.

FIG. 3 is a plan view of a semiconductor optical modulator according to the first embodiment of the present invention.

In the first embodiment shown in FIG. 3, an InP Mach-Zehnder modulator fabricated on an InP substrate will be described as an example of an optical semiconductor. Since it is known that a semi-insulating (SI)—InP substrate is used in an InP Mach-Zehnder modulator which realizes a wide-band/high-baud rate operation, a case where the SI—InP substrate is used will be described in this embodiment.

FIG. 3 is a plan view of the substrate of the InP Mach-Zehnder modulator according to the first embodiment of the present invention from the top. The InP Mach-Zehnder modulator of FIG. 3 is provided with an input optical waveguide 101a for optical input, a 1×2 MMI coupler 102 connected to the input optical waveguide 101a, two arm optical waveguides connected to the 1×2 MMI coupler 102, and a 2×1 MMI coupler 103 connected to the two arm optical waveguides. The side opposite to the two arm optical waveguides of the 2×1 MMI coupler 103 is connected to an output waveguide for optical output. In addition, bank patterns 110a and 110b for high-order mode radiation are formed on upper and lower sides (both sides) of the output waveguide in the 2×1 MMI coupler 103 above and below the output waveguide. The InP Mach-Zehnder modulator of FIG. 3 is provided with traveling wave type electrodes 300a and 300b and Ground electrodes 300c, 300d constituting a differential RF line. The traveling wave type electrodes 300a and 300b are provided with T-shaped and reverse T-shaped lateral rod electrode portions 121 which project periodically. The lateral rod electrode portion 121 is disposed on the two arm optical waveguides. The differential modulated electrical signals DATA and /DATA are input from the left side of the traveling wave type electrodes 300a and 300b.

Figure 1:
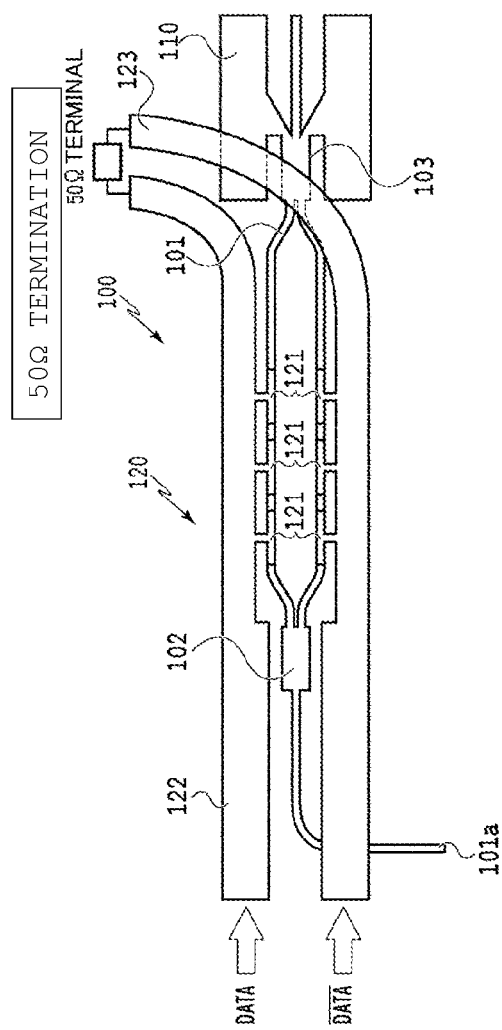
FIG. 1 is a diagram showing an example of a conventional Mach-Zehnder modulator.

In the InP Mach-Zehnder modulator of the first embodiment, the structure of the optical waveguide is basically the same as that of the conventional Mach-Zehnder modulator MZM shown in FIG. 1. However, two rows of traveling wave type electrodes 300a and 300b driven by a differential modulated electrical signal (RF modulation signal Signal: DATA, /DATA) provided on the substrate surface form a phase modulation part having a so-called GSSG configuration (G: Ground, S: signal), by sandwiching both sides thereof between a set of Ground electrodes 300c and 300d.

Although the GSSG configuration is described as an example of the differential line configuration in this drawing, the GSGSG configuration or an SS configuration with no ground may be adopted as long as the differential line configuration is adopted.

As shown in FIG. 3, in the optical modulator according to the first embodiment, traveling wave type electrodes 300a and 300b constituting a differential RF line driven by the differential modulated electrical signals DATA and /DATA do not have bending at the RF line portion (the terminal parts) after phase modulation unlike the conventional structure of FIG. 1. In the pair of differential RF lines, three portions of termination resistors 302a and 302b including the traveling wave type electrodes 300a and 300b, two connecting pads 301a and 301b connected to the terminal parts of the traveling wave type electrodes 300a and 300b, and two rectangular resistors connected to the connecting pads 301a and 301b are formed linearly and terminated on-chip.

The termination resistors 302a and 302b are formed on bank patterns 110a and 110b for high-order mode radiation connected to the 2×1 MMI coupler 103, respectively.

Basically, when there is a bank pattern directly under the radio frequency (RF) line, a p-type or n-type semiconductor layer structure that is a conductor exists, which leads to an increase in RF loss and deterioration of RF characteristics. In the InP Mach-Zehnder modulator of the present embodiment, as shown in FIG. 3, except for the 2×1 MMI coupler portion 103, an isolated high-mesa structure having no bank pattern is formed.

A right end (terminal end side) of the two termination resistors 302a and 302b is short-circuited by a conductive short-circuit part 303 such as a metal to form an on-chip terminal.

In addition, in FIG. 3, in order to simplify the termination resistor portion, the ground is not provided on the right and left sides of the signal line, but a terminal structure may be provided with the ground. In this case, the bank pattern is enlarged, and the ground electrode may be provided on the bank pattern or on a part having no bank pattern, similarly to the resistors 302a and 302b. Furthermore, a GSGSG structure may be adopted in which there is a ground between two resistors 302a and 302b.

Figure 4:
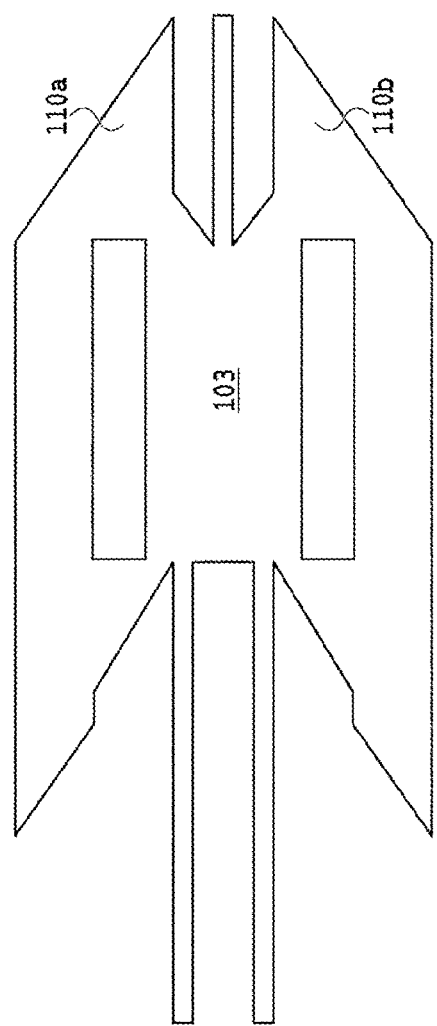
FIG. 4 is an enlarged plan view of the structure of the terminal structure of the semiconductor optical modulator according to an embodiment of the present invention.

FIG. 4 is a plan view showing the 2×1 MMI coupler 103 and bank patterns 110a and 110b in the terminal part of the differential RF line of FIG. 3 in an enlarged manner. However, in FIG. 4, the bank patterns 110a and 110b are alternative examples of the bank patterns shown in FIG. 3. As shown in FIG. 4, the 2×1 MMI coupler 103 has two arm waveguides connected to the input side, and an output waveguide connected to the output side. The bank patterns 110a and 110b are drawn out in an oblique direction to a propagation direction of the output light from both sides of the connection position of the output waveguide of the 2×1 MMI coupler 103. The bank patterns 110a and 110b are formed to surround the 2×1 MMI coupler 103. In FIG. 4, two bank patterns 110a and 110b connected to the output side of the 2×1 MMI coupler 103 have a cut part, and are formed in an arrow-like shape li. This structure is an optimum structure for processing radiation light in a high-order mode in MMI. Specifically, unlike the bank pattern 110a and 110b of FIG. 3, the angle of each vertex in the bank patterns 110a and 110b of FIG. 4 is constituted by a straight line or a curve so that the internal angle is an appropriate angle while avoiding a shape such as a right angle of (90) or 45, and the angle is designed at an appropriate angle so that the radiation light is emitted forward without geometrically returning to the MMI side. Therefore, it is a feature of the present structure that the high-order mode radiation light is prevented from returning to the MMI side as stray light, and optical characteristics can be secured. However, as long as the high-order mode light of the multimode interference coupler is appropriately radiated and stray light can be suppressed, the bank pattern is not limited to FIG. 4, and may have the structure shown in FIG. 3 or any other shape.

FIG. 5 is a plan view showing an enlarged view of a terminal portion of a differential RF line including the resistors 302a and 302b formed on the 2×1 MMI coupler 103 and the bank patterns 110a and 110b shown in FIG. 4, connecting pads 301a and 301b continued from the differential RF lines 300a and 300b, and a short-circuit member 303.

(A), (B), and (C) of FIG. 6 are substrate cross-sectional views of the substrate at the positions of the three substrate cross-sections A-A', B-B' and C-C' perpendicular to the waveguide shown in FIG. 5, respectively.

The substrate cross-sectional view (A) of FIG. 6 is a substrate cross-sectional view of the vicinity A-A' of the terminal part of the connecting pad portions 301a and 301b of FIG. 5, and the substrates under the connecting pad portions 301a and 301b are laminated from the top in order of i-InP and MQW layers 601, n-InP layers 602, an SI—InP layer (substrate) 603.

As described above, the electrodes of the connecting pad portions 301a and 301b are formed in a tapered shape (or a shape in which a tapered shape and a rectangular parallelepiped are continued), and are formed by gradually widening the width of the tapered shape along the light propagation direction for impedance matching (and/or the area of a rectangular parallelepiped continued from the tapered shape is designed and formed), and the thickness and width of i-InP, MQW layer 601 and n-InP layer 602 are also formed in consideration of impedance matching.

The central portion of the substrate cross-sectional view (A) is a cross-section of the arm optical waveguide of the MZM. However, a capacitive loading structure 121 is not formed on the optical waveguide. The other portions of the upper layer are buried with a dielectric material such as BCB.

The substrate cross-sectional view (B) of FIG. 6 is a substrate cross-sectional view of the portion VIB-VIB' of the resistors 302a and 302b of FIG. 5, and the substrates under the resistors 302a and 302b are laminated in order, as in the substrate cross-sectional view (A), I-InP and MQW layers 601, an n-InP layer 602 and an Si—InP layer (substrate) 603. The central portion of the substrate cross-sectional view (B) is a cross-section of the 2×1 MMI coupler 103.

The substrate cross-sectional view (C) of FIG. 6 is a substrate cross-sectional view of the substrate cross-section VIC-VIC' of FIG. 5, and is a substrate cross-sectional view corresponding to the entrance portions of the connecting pads 301a and 301b. The central portion of the substrate cross-sectional view (C) is a cross-section of the arm optical waveguide of the MZM. However, the capacitive loading structure 121 is not formed on the optical waveguide. The other portions of the upper layer are buried with a material such as BCB.

Referring back to FIG. 3, the differential RF line for optical phase modulation is exemplified by a capacitive loaded type traveling waveform electrode structure having a GSSG structure excellent in a wide band characteristic, but other differential RF line structures can be used.

It is important that the terminal structure from the differential RF lines 300*a* and 300*b* of the phase modulation part constituted by the capacitive loading structure to the resistors 302*a* and 302*b* is disposed in parallel and straight line with respect to the waveguide as shown in FIG. 3. This is because if the structure includes not a straight line but bending, the quality of the differential RF signal contributing to phase modulation is deteriorated.

Similarly, from the viewpoint of signal quality of the differential RF signal, a structure from the capacitive loading differential RF lines 300*a* and 300*b* to two resistors 302*a* and 302*b* for differentially terminating the RF signal via connecting pads 301*a* and 301*b* is formed without bending in the same direction as the propagation direction of the capacitive loading structure (on the same straight line in a wide sense).

Since the connecting pads 301*a* and 301*b* are arranged in the front stage of the termination resistors 302*a* and 302*b* and are patterns before differential terminal, it is desirable that the connecting pads are matched with the line impedance of the capacitive loading structures 300*a* and 300*b* of the continuous phase modulation part even if the connecting pads have a size of, for example, several 10 µm or less.

When the connecting pad has a shape in which impedance matching is not achieved or impedance design is not performed, impedance mismatching occurs between the connecting pad and the capacitive loading structure before the differential signal is terminated, reflection occurs between them before terminal, and the RF characteristics (reflection characteristics, transmission characteristics, etc.) of this chip are greatly deteriorated.

Therefore, although the name is a connecting pad, it is necessary to design it as a differential RF line regardless of its size, and to design the impedance not only in the vicinity of DC but also in the frequency section up to the frequency band to be used.

When viewed in a structure of only (the traveling wave type electrodes 300*a* and 300*b* not disposed on the optical waveguide) except the capacitive loading structure 121, it looks higher in impedance than when viewed in total including the capacitive loading structure 121.

This is because there is no electrode pattern (T-shaped horizontal bar) disposed on the optical waveguide for adjusting/imparting a capacitance component for realizing a desired impedance, which is originally the basis of the capacitive loading structure 121 in the main line alone.

Therefore, in FIG. 3, the connecting pad portions 301*a* and 301*b* are formed into tapered shapes whose width is about five times from the main line width of the portion of the capacitance loading structure, thereby increasing the capacitance of the connecting pad portions and achieving impedance matching with the differential RF line portion of the phase modulation part.

In FIG. 3, the connecting pad portions 301*a* and 301*b* are formed in a shape in which a tapered light propagation direction length is 50 µm, and a rectangular portion having a length of 50 µm being in contact with the resistor is disposed thereafter.

From the viewpoint of impedance matching, it is desirable that the taper length of the connecting pad portion be at least 100 µm or less because the line having a higher impedance than the desired impedance continues.

However, since the capacitance cannot be sufficiently increased only by this tapered shape, a rectangular electrode pattern is provided after passing through the tapered portion, and as shown in (B) of FIG. 6, an n-type semiconductor layer 602 formed on the SI—InP substrate and a non-doped semiconductor layer 601 formed by regrowth are provided in at least a part of the lower portion thereof. Accordingly, it may be configured to have strong capacitance in the laminating direction and obtain impedance matching.

When adjusting the capacitance, the length of the rectangular electrode portion having the n-type semiconductor layer and the non-doped semiconductor layer provided at the lower part of the rectangular electrode pattern after passing through the tapered shape portion can be lengthened, or the width of the semiconductor layer may be widened as the entire width instead of the width of a part of the rectangular electrode portion, or the width of the semiconductor layer may be adjusted. Accordingly, capacitance can be adjusted.

In the configuration of the present embodiment, the semiconductor layer or the like is not provided in the tapered portion of the connecting pad, but the semiconductor layer or the like is formed on a low dielectric 604 such as BCB (Benzocyclobutene) or the like. However, the semiconductor layer may be formed at the bottom of the tapered portion, when there is a shape in which impedance matching is achieved.

Although the n-type semiconductor layer 602 is used as the semiconductor layer in the above-described embodiment, the n semiconductor layer may be formed by a p-type semiconductor layer. The thickness of the n-type semiconductor layer or the p-type semiconductor layer is preferably at least about 50 nm or more to sufficiently obtain an influence in terms of RF.

The non-doped semiconductor layer 601 under the pad or the resistor, except for the waveguide portion shown in FIG. 6, can be formed of a dielectric material other than a semiconductor, and a low dielectric material such as, for example, BCB can be selected. In this case, however, since the dielectric constant is lower than that of the non-doped layer of a semiconductor such as InP, the dielectric constant of the area in which the line is formed is reduced, that is, the capacitance is reduced, and which is not so desirable from the viewpoint of increasing the capacitance.

Further, although only one n-type semiconductor layer is simply formed in the embodiment, at least one n-type or p-type semiconductor layer and at least one dielectric layer may be formed. A plurality of n-type or p-type semiconductor layers or dielectric layers may be present, and for example, a pin structure or the like may be used to form a general phase modulation part in which the n-type semiconductor layer and the p-type semiconductor layer are mixed with a non-doped MQW or InP layer. Further, a dielectric such as a glass film may be further formed on the pin structure.

(Material of Termination Resistor)

In consideration of the manufacturing process, as the termination resistor material, it is desirable to select a resistor material of the same kind as that of a heater (not shown) for forming an electrode for adjusting the operating point of the modulator. By using the same kind of resistor material, a termination resistor can be manufactured, for example, together with a heater electrode requiring phase adjustment in the same process.

In this case, however, since the resistance value for the terminal is affected by the design value of the resistor of the operating point adjusting electrode, it is difficult to select a resistor material having a high resistance as used in a general analogue IC or the like.

Of course, it is also possible to select a resistor material having a higher resistance different from that of the heater and to shorten the length of the resistor in the propagation direction as much as possible. Although it is desirable from the viewpoint of RF characteristics, in that case, an additional process of providing a termination resistor is provided in a separate process from the heater for the operating point adjustment electrode, which increases/complicates the manufacturing process and increases the manufacturing cost, which is not very desirable In addition, although it is desirable that the upper part of the resistor is covered with a dielectric such as glass from the viewpoint of oxidation prevention, since desired characteristics can be realized even without the dielectric such as glass, it is not essential. In each of the drawings of the first embodiment of the present invention, the glass film covering such a resistor is omitted from the viewpoint of simplification of the drawings.

In terms of RF, it is desirable that the terminal be terminated with a minimum area, and in view of the influence on the reflection characteristics, it is desirable that the length of the termination resistor in the propagation direction be at least 200 µm or less.

The width of the resistor is preferably 5 µm or more from the viewpoint of manufacturing variations and stability of the resistance value. If the width becomes narrower than this, the variation of the resistance value becomes large with respect to a slight fluctuation in the width at the time of manufacturing, and the reflection characteristic becomes a factor of variation or deterioration.

Since the termination resistor portion including the connecting pad and the resistor is seen as a certain kind of differential transmission line, it should be handled as an RF line in design, and it is desirable that the termination resistor has a rectangular shape so that an RF signal can be propagated in a straight line. This is because, although it is possible to form a resistor with a meandering shape other than a straight line, when considering such a shape as a differentially coupled transmission line, the signal quality deteriorates due to the occurrence of bent parts.

In addition, it is desirable that the length of the termination resistor portion including the connecting pad and the resistor in the propagation direction be sufficiently small to reduce reflection at the operating frequency, and it is desirable that the length be at least ¼ or less, preferably ⅛ of the wavelength of the RF signal within the frequency used to transmit the differential RF line.

On the other hand, because the width and length of the resistor part are also determined by the impedance required for the resistor as an RF line, when the resistor is regarded as an line compared to an RF line formed of general metal, the degree of freedom for impedance design is extremely low. Therefore, similarly to the connecting pad portion, in the lower part of the resistor, an n-type semiconductor layer formed on the SI—InP substrate and a non-doped semiconductor layer formed by regrowth are provided in at least a part of the lower part, and the degree of freedom of the design of capacitive/RF line can be greatly improved.

In this case, considering the thickness of the resistor, it is desired to stably form a pattern on a flat surface without a step to eliminate the risk of disconnection or the like. Therefore, unlike the pad portion described above, it is desirable to form the n-type semiconductor layer and the non-doped semiconductor layer below the entire resistor region.

Specifically, in order to reliably form the resistor on the n-type semiconductor layer and the non-doped semiconductor layer, the n-type semiconductor layer and the non-doped semiconductor layer are provided to be wider in the width direction than the resistor by 5 µm or more from the viewpoint of realizing a stable process.

This is because if the n-type semiconductor layer and the non-doped semiconductor layer are made narrower than this, the resistor overflows from the semiconductor layer, and the flatness cannot be secured, and there is a risk of an occurrence of disconnection in a part.

From the viewpoint of reducing the size of the optical modulator and efficiently integrating the termination resistor on the chip, in the multimode interference coupler (1×2, 2×1, 2×2, etc.) as shown in FIG. 1 (and FIG. 3), it is possible to utilize the bank pattern 110 of the high-order mode light emitting means. By forming the termination resistor on the shape of the bank pattern, the termination resistor reduced in size can be realized without generating an unnecessary pattern. In particular, from the viewpoint of not increasing the size, it is desirable that the multimode interference coupler be combined waves (2×1 or 2×2, etc.) in terms of the configuration of the RF line.

Further, as shown in FIG. 3, it is preferable that the lines forming the differential pair up to this point be short-circuited immediately after passing through the resistor. This is because if the configuration is not short-circuited, the signal components that could not be completely terminated by the resistor will be transmitted as they are, and the reflection characteristics will deteriorate.

A short circuit is desirable, because the short circuit completely cancels the differential signal at the middle point of the differential pair (the middle point of the metal short circuit member 303 forming the short circuit).

For example, by simulation, comparing the results with and without a short circuit, it can be seen that there is a difference in reflection characteristics of at least several dB.

Second Embodiment

FIG. 7 shows an image of the IQ optical modulator according to a second embodiment of the present invention when the driver pad is provided separately for IQ.

FIG. 7 is basically an image in which two optical modulators of the first embodiment of the present invention of FIG. 3 are arranged side by side, a driver driving voltage is applied from the driver driving voltage application PAD700I and 700Q provided at the center of the short-circuit member at the terminal part of each optical modulator, and a modulated light is output from the optical waveguide of the bottom of each PAD (not shown). In the IQ optical modulator shown in FIG. 7, the two differential electrode lines have a GSSG configuration, but other differential line configurations such as an SS configuration in which ground is eliminated or a GSGSG configuration in which ground is provided between SS may be adopted. If four optical modulators of the first embodiment are arranged, a Twin-IQ optical modulator can be provided, and it can cope with multiple polarized waves.

FIG. 8 shows an example of the IQ optical modulator image of the second embodiment in which the driver PAD is collected by IQ. The driver driving voltage application terminals of the two optical modulators are collected as a driver driving voltage application PAD 900 on the right lower side of FIG. 8, and IQ is collected into one by a channel. In the case where four optical modulators are arranged for polarization multiplexing, the IQ may be collected for X polarization and Y polarization, or the IQ may be divided into one for X polarization and Y polarization. Although the IQ optical modulator of FIG. 8 has a GSSG configuration in the IQ optical modulator, there may be other differential line configurations such as an SS configuration in which ground is eliminated or a GSGSG configuration in which ground is provided between SS.

FIG. 9 is a diagram showing another image of the IQ optical modulator according to the second embodiment. An example of the structure of the optical waveguide constituted by the MZ modulator of the parent-child structure forming a nest is shown.

The IQ optical modulator shown in FIG. 9 is a so-called nested MZM in which each arm of a parent MZM is including a child MZM 100. Two differential electrode lines (IchDATA, Ich/DATA, QchDATA, Qch/DATA) that phase-modulate the optical signal propagating through the MZM optical waveguide by applying a modulation signal are each provided along the two arms that make up the child MZM optical waveguide. In the IQ modulator shown in FIG. 9, the driver driving voltage application PAD 900 has I and Q channels disposed in the vicinity of about the middle of the channel. The arrangement of the driver driving voltage application PAD 900 may be an arbitrary position between I channel and Q channel or a position offset to the Q channel side (see FIG. 8) or a position offset to the I channel side not between I channel and Q channel. As shown in FIG. 9, the two differential electrode lines have an SS configuration in which ground is eliminated. The two differential electrode lines may have a GSSG configuration or a GSGSG configuration having a ground electrode. As shown in FIG. 9, a width of the lead-out portion of the electrode line 122 constituting the two differential electrode lines (a length in the direction orthogonal to the propagation direction of the modulation signal) is wider than the portion in which the traveling wave type electrode 121 is provided. The width of the lead-out portion may be the same as the width of the portion in which the traveling wave type electrode 121 is provided, or may be narrower than the width of the portion in which the traveling wave type electrode 121 is provided.

(Connection of Driver IC and IQ Optical Modulator)

FIG. 10 shows an example of connection between an open collector type or an open drain type driver IC and the IQ optical modulator according to the second embodiment of the present invention.

FIG. 10 shows an example in which a driver IC 1001 having two sets of output pads of the GSGSG array at the left end of the drawing is connected to the IQ optical modulator 1000 of 2 ch. Although the output destination of each center G pad of two sets of output pads of the GSGSG array of the driver IC 1001 is not shown, it may be connected to a ground electrode (not shown) or a part of an arbitrary ground voltage provided between arms of each optical modulator of the IQ optical modulator 1000.

In FIG. 10, the connection to the driver IC is expressed by wire connection, but connection via a circuit board or flip-mounting via a bump may be used.

When connection between the IQ optical modulator and the driver IC is considered, power is supplied to the driver IC 1001 from the driver driving voltage application PAD 1100 of the IQ optical modulator via the termination resistor and the phase modulation part. In this case, it is desirable to apply a voltage from the middle point of the short-circuit electrode terminating the differential signal line of the optical modulator in which the differential signal is completely canceled.

When the driving voltage of the driver IC is applied from the other portion, since the differential signal component which cannot be completely canceled remains, there is a possibility that noise is added to the driving voltage of the driver IC and the driving of the driver IC is unstable.

Further, in the case where the IQ optical modulator is formed by arranging at least two Mach-Zehnder modulators as shown in FIG. 9 is considered, the wiring may be pulled from the middle point of the short-circuiting conductor 303 of the termination resistor once, and then collected into one wiring for applying the driver voltage of another channel.

In these configurations, since a voltage for driving the driver IC is applied through the termination resistor of the differential line for modulation signal of the optical modulator, a current for driving the driver IC flows through the resistor of the termination resistor. Therefore, heat generation of the resistor increases during driver connection operation, and operation stability and long-term stability of the Mach-Zehnder modulator are imparted. It is desirable that the heating element (that is, the resistor) be separated by 10 μm or more from the optical waveguide of the optical modulator.

Furthermore, in terms of suppressing the thermal influence on the optical waveguide, ideally, it is desirable to provide a separation groove for separating heat on the side of the optical waveguide, but this is not an essential configuration.

Further, in the case where connection with the open collector type or open drain type driver IC is considered, since the output terminal of the driver IC is open, the RF signal which cannot be terminated by the termination resistor is reflected from the termination resistor side to the driver side.

Thereafter, since the output terminal of the driver is open, the signal is reflected again at the output terminal of the driver, and by repeating the multiple reflection in this way, periodic waviness caused by the length of the signal line is generated in the RF characteristic.

When the periodic swell of this RF characteristic differs between channels (between I and Q channels of the IQ modulator), signal processing may not be successful and transmission characteristics may deteriorate, which is not desirable.

Figure 2:
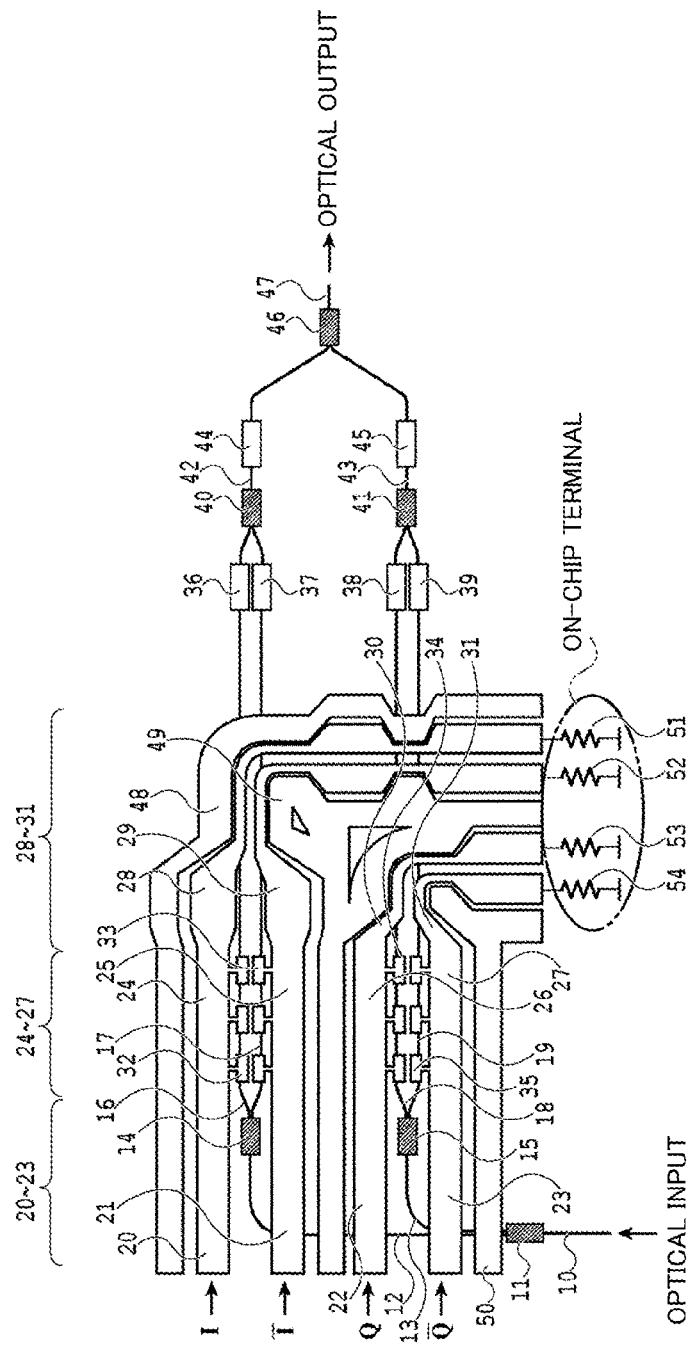
FIG. 2 is a diagram showing an example of a conventional IQ optical modulator.

For example, since the IQ optical modulator of the conventional structure shown in FIG. 2 is based on the off-chip terminal structure, the length of the transmission line is designed to be different due to the difference in the length of the bent portion between the IQs, and the difference in the period of the waviness of the RF characteristic between the IQs, which is the deterioration factor of the transmission characteristic, occurs.

On the other hand, in the configuration of the embodiment of the present invention, since the terminal is realized on-chip, the configuration of the bent line causing deterioration of the transmission characteristics is not required, and the RF line is made up of a straight RF line not including the bent line. As a result, a line structure of the same length can be formed between all channels, and periodic waviness different between channels is not generated in RF characteristics. When the waviness occurs, since the length is equalized, the same period is obtained for all channels.

In the structure of the embodiment of the present invention, impedance matching and smooth RF signal transmission are realized in all the portions of the RF line constituting the modulator and in the operating frequency band as described above. Therefore, the fluctuation of the reflection characteristic with respect to the modulation signal made incident from the driver side can be suppressed to below 15 dB which is a threshold value for preventing the waviness.

(Reflection Characteristics of Phase Modulator to Frequency)

FIG. 11 shows reflection characteristics with respect to frequencies in the optical phase modulator according to the embodiment of the present invention using the above-described configuration of the termination resistor. In the optical modulator having the structure of the termination resistor, it can be confirmed that very excellent suppression of reflection characteristics of −20 dB or less in the modulation frequency range up to about 53 GHz and −15 dB or less in the modulation frequency range up to 65 GHz can be realized. Therefore, it can be said that the optical modulator of the embodiment of the present invention has a termination resistor suitable for ultra-high speed operation of 64 GBd or more.

Further, the structure of the embodiment of the present invention has the advantage that the chip size can be reduced because the bending structure as in the conventional structure is eliminated.

Of course, unlike the above embodiments, it is also possible to directly connect the direct capacitive loading structure and the resistor without connecting pads. However, in this case, since the capacity of the capacitive loading structure is insufficient and the impedance increases, it is necessary to further add the capacity supplemented by the connecting pad portion. In this case, it is also possible to realize impedance matching with the capacitive loading type structure in the overall structure of the termination resistor, by making the distance between the two resistors close to each other or enlarging the area of the n-type or p-type semiconductor below the resistors.

Furthermore, in the embodiment of the present invention, since it is only necessary to mainly pay attention to a differential mode contributing to modulation with respect to transmission characteristics, the terminal structure of the in-phase mode is not included in the configuration of the embodiment of the present invention, and is a structure in which only the terminal of the differential mode is performed. In the case of terminating the in-phase mode, a resistor for terminating the in-phase mode may be further disposed after the differential terminal is performed and the RF line is short-circuited.

Although the present embodiment is described as an SI—InP substrate, a substrate other than semi-insulating properties such as an N—InP substrate or a P—InP substrate may be used. When the semi-insulating substrate is not used, unlike the case where the semi-insulating substrate is used, since the substrate itself is n-type or p-type, it is not necessary to laminate at least one or more n-type or pnp-type semiconductor layers on the substrate.

The present invention is not limited to the InP-based material, and for example, a material system matching with a GaAs substrate, a Si substrate, or the like may be used.

INDUSTRIAL APPLICABILITY

As described above, in the semiconductor optical modulator according to the embodiment of the present invention, the RF line of the modulation signal can be terminated on a chip with high accuracy over a wide band, and an ultra-wide band semiconductor optical modulator having a small termination resistor can be realized. When the optical modulator is connected to, for example, an open collector type driver, periodic waviness of RF characteristics can be suppressed, and waviness of RF characteristics can be suppressed.

The invention claimed is:

1. A semiconductor optical modulator comprising:
   a radio frequency (RF) line which is disposed parallel to an optical waveguide and is a differential configuration for transmitting an RF modulation signal,
   a connecting pad which is formed in the same direction continuously with the RF line, and
   a termination resistor which has two rectangular resistors for differentially terminating the RF modulation signal from the connecting pad, wherein
   the RF line, the connecting pad, and the termination resistor are linearly disposed, and the RF line is terminated on-chip, and
   an opposite side of the connecting pad of the termination resistor is short-circuited,
   wherein
   the connecting pad and the termination resistor are formed on at least one or more n-type or p-type semiconductors and at least one or more non-doped semiconductor layers,
   the optical waveguide is formed in an independent high-mesa structure,
   the semiconductor optical modulator has a higher-order mode light emitting structure for emitting higher-order mode light of a multimode interference coupler of a Mach-Zehnder interference system configured in a high-mesa structure, and
   the resistor is disposed on the higher-order mode light emitting structure.

2. The semiconductor optical modulator according to claim 1, wherein
   at least a part of the connecting pad and the whole of the resistor of the termination resistor are formed on at least one or more n-type or p-type semiconductor layers sequentially formed on an insulating semiconductor substrate, and at least one or more dielectric layers formed on the semiconductor layer.

3. The semiconductor optical modulator according to claim 2, wherein
   the semiconductor layer under the resistor has a width larger than that of the resistor by at least 5 μm or more, and
   the resistor is disposed at a position separated by 10 μm or more from the optical waveguide.

4. The semiconductor optical modulator according to claim 1, wherein
   the optical waveguide is formed in an isolated mesa structure and connected to a multimode interference coupler, and the multimode interference coupler is a multimode interference coupler for combined waves having a high-order mode light emitting structure, and
   the resistor of the termination resistor is disposed on the higher-order mode light emitting structure.

5. The semiconductor optical modulator according to claim 4, wherein
   the higher-order mode light emitting structure has a shape of an arrow blade.

6. The semiconductor optical modulator according to claim 1, wherein the semiconductor optical modulator has a heater-type phase controller, the heater-type phase controller is constituted by the same resistor as the resistor forming the termination resistor, and an upper surface of the resistor is covered with a dielectric.

7. The semiconductor optical modulator according to claim 1, wherein
a length of the resistor in the propagation direction is equal to or less than ¼ of the wavelength in the substrate of an operating frequency, a length of the resistor in the propagation direction is equal to or less than 200 μm, and a width of the resistor is equal to or more than 5 μm.

8. A semiconductor optical modulator comprising:
a radio frequency (RF) line which is disposed parallel to an optical waveguide and is a differential configuration for transmitting an RF modulation signal,
a connecting pad which is formed in the same direction continuously with the RF line, and
a termination resistor which has two rectangular resistors for differentially terminating the RF modulation signal from the connecting pad, wherein
the RF line, the connecting pad, and the termination resistor are linearly disposed, and the RF line is terminated on-chip, and
an opposite side of the connecting pad of the termination resistor is short-circuited, wherein
the RF line being the differential configuration for transmitting the RF modulation signal of the semiconductor optical modulator is connected with an open collector-type or open drain-type driver IC via a flip mounting using a bump, a wire, or a circuit board, and
a voltage for driving the driver IC is applied to a middle point which is short-circuited after being terminated by the resistor of the semiconductor optical modulator.

9. A semiconductor optical modulator comprising:
a radio frequency (RF) line which is disposed parallel to an optical waveguide and is a differential configuration for transmitting an RF modulation signal,
a connecting pad which is formed in the same direction continuously with the RF line, and
a termination resistor which has two rectangular resistors for differentially terminating the RF modulation signal from the connecting pad, wherein
the RF line, the connecting pad, and the termination resistor are linearly disposed, and the RF line is terminated on-chip, and
an opposite side of the connecting pad of the termination resistor is short-circuited, wherein
at least two or more of the semiconductor optical modulators are disposed parallel to each other to form at least one IQ optical modulator, and
all of the wirings for applying a voltage for driving a driver IC are arranged in one.

\* \* \* \* \*